United States Patent [19]

Marotta

[11] 4,191,100

[45] Mar. 4, 1980

[54] BREWING APPARATUS FOR COFFEE AND THE LIKE

[75] Inventor: Vincent G. Marotta, Shaker Heights, Ohio

[73] Assignee: North American Systems, Inc., Bedford Heights, Ohio

[21] Appl. No.: 741,621

[22] Filed: Nov. 15, 1976

[51] Int. Cl.² ............................................. A47J 31/10
[52] U.S. Cl. ......................................... 99/299; 99/304; 99/318
[58] Field of Search ................ 99/279, 299, 323, 449, 99/304; 220/8

[56] References Cited

U.S. PATENT DOCUMENTS

| | | | |
|---|---|---|---|
| 640,418 | 1/1900 | Royer | 220/8 X |
| 918,674 | 4/1909 | Hathaway | 99/318 X |
| 958,857 | 5/1910 | Dennis | 99/449 UX |
| 1,005,998 | 10/1911 | Munchausen | 220/8 |
| 1,714,266 | 5/1929 | Johnson | 220/8 |
| 1,778,792 | 10/1930 | Cameron | 99/284 |
| 1,991,198 | 2/1935 | Edtbauer | 99/299 |
| 2,052,476 | 8/1936 | Koch | 99/298 |
| 2,103,780 | 12/1937 | Hadley | 99/284 X |
| 2,369,728 | 2/1945 | Farkas | 220/8 UX |
| 2,799,424 | 7/1957 | Good | 220/8 |
| 3,102,465 | 9/1963 | Montesano | 99/323 |
| 3,140,777 | 7/1964 | Gordan | 220/8 X |

FOREIGN PATENT DOCUMENTS 3101 of 1864 United Kingdom ...................... 99/298
270206 of 1927 United Kingdom ...................... 99/449

*Primary Examiner*—Harvey C. Hornsby
*Assistant Examiner*—Arthur O. Henderson

[57] ABSTRACT

The present invention relates to an infusion apparatus, particularly such an apparatus for brewing coffee or the like where a receptacle such as a coffee basket is mounted on a water heating apparatus and a carafe is positioned underneath the infusion chamber. The infusion chamber is made with relatively movable walls so that the cross-sectional area transverse to the direction of flow of liquid may be varied to vary the depth of infusion bed for a given quantity of coffee or the like in the chamber. Two movable walls are disclosed together with an actuating mechanism with the movable walls and the actuating mechanism being of simple construction and readily assembled so that the use of screws, rivets, and so forth is not required. The relatively movable walls are actuated by a rotatable plate connected to the walls which are positioned internally of the infusion chamber with rotation of the plate moving the walls toward and away from each other. A clip is provided for holding the top of the filter against the top of the side walls of the receptacle forming the infusion chamber.

15 Claims, 10 Drawing Figures

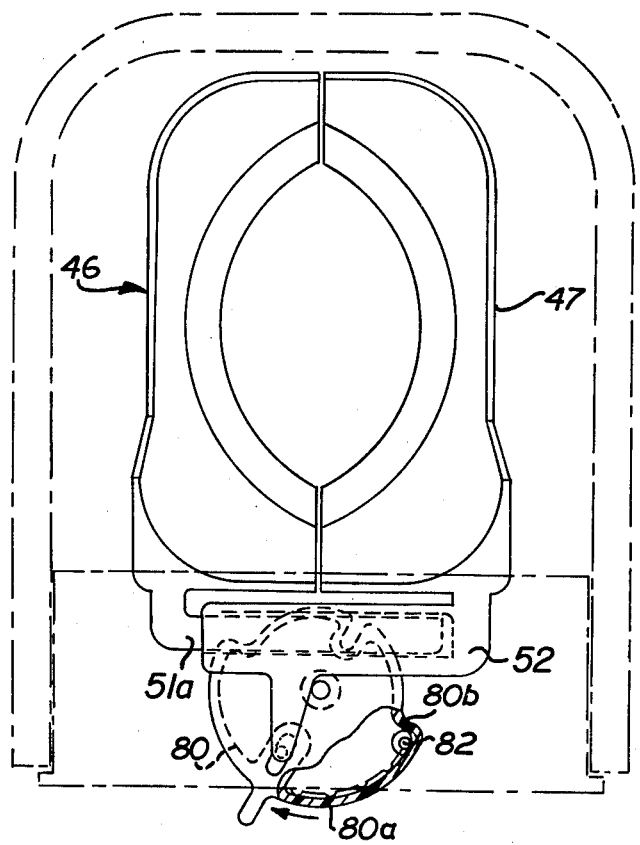
_Fig. 4_
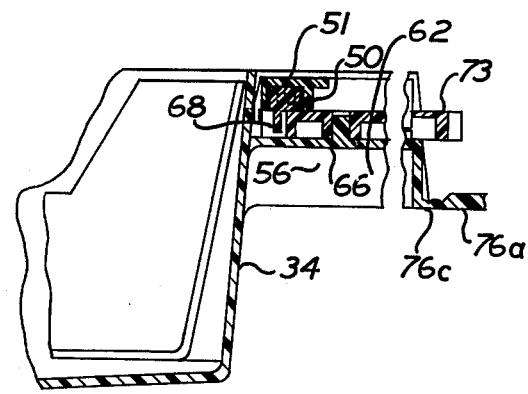
_Fig. 6_
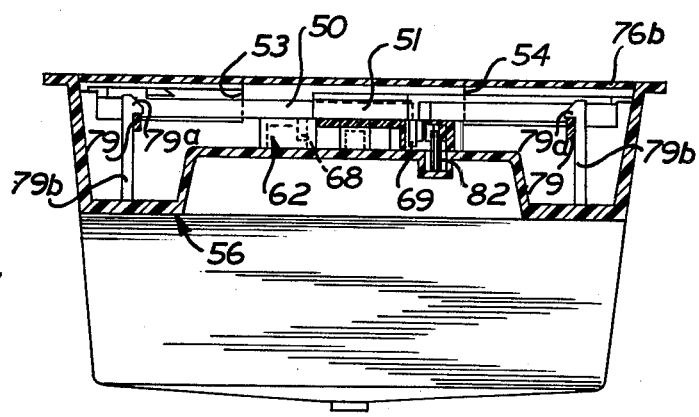
_Fig. 5_
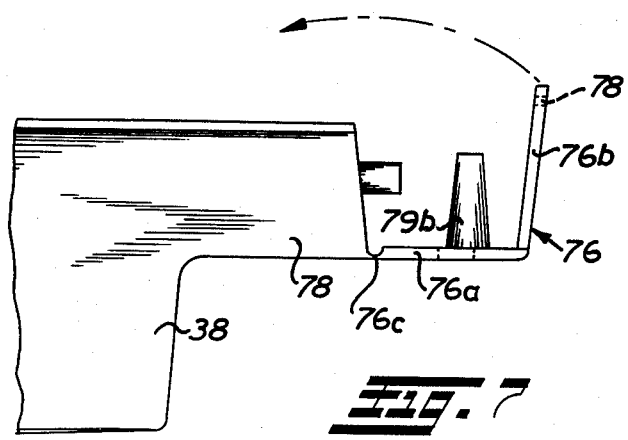
_Fig. 7_
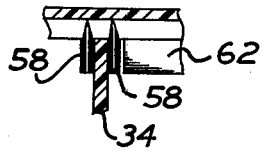
_Fig. 10_

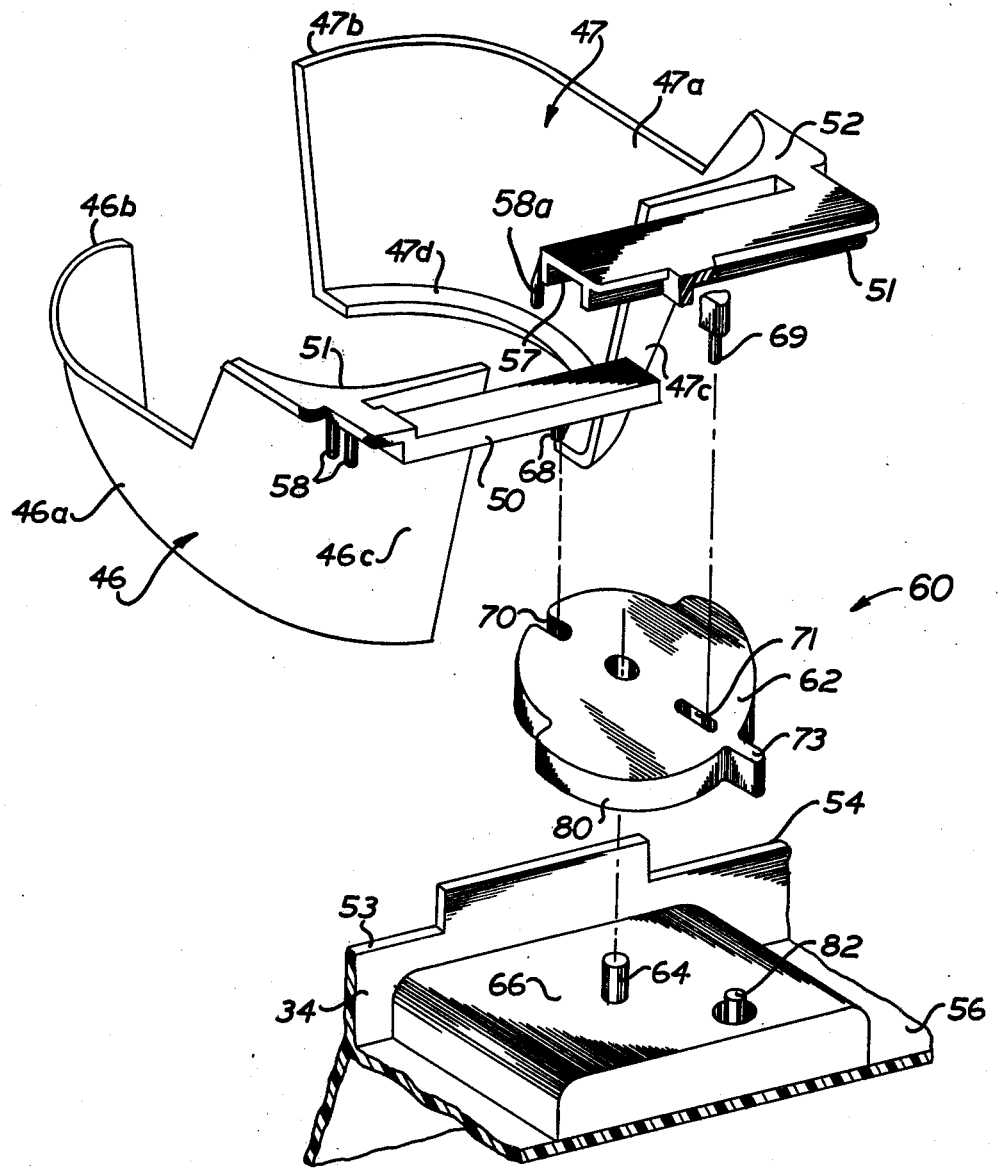

BREWING APPARATUS FOR COFFEE AND THE LIKE

The present invention relates to a coffee brewing apparatus particularly a brewing apparatus for brewing coffee by the drip method in which heated water flows by gravity through coffee grounds in an infusion basket and into a container such as a carafe. While the present invention is particularly directed to the brewing of coffee and the description will proceed with respect to coffee, it will be understood that the invention is also applicable to infusing a liquid with other substance, e.g. tea.

Conventionally, coffee brewers are made to brew from two to ten cups of coffee depending on the quantity the user desires. The quantity of coffee grounds recommended to the user is generally a fixed measure per cup of coffee. However, when smaller quantities are being brewed, it is often necessary to add additional coffee to maintain the strength since the size of the coffee infusion chamber is fixed and time of contact of the water with the coffee grounds will be normally less when a small quantity of coffee is used in the coffee basket.

The present invention particularly relates to a coffee or the like brewing apparatus in which the coffee basket (infusion chamber) is supported by the water heating apparatus and a carafe is movable into and out of a position underneath the coffee basket. In such a brewer the height dimensions of the basket is constrained to accommodate the carafe.

To avoid the above described problem in the style of coffee maker described, a prior coffee brewer disclosed in U.S. Pat. No. 3,423,209 attempts to maintain a relatively constant infusion time (the time in which the water is in contact with the coffee grounds) for different quantities of ground coffee in the infusion basket by using a variable air pressure to force the liquid through the grounds at different velocities depending upon the quantity being brewed. This obviously requires a relatively complex and expensive mechanism and will also require more coffee than when using a gravity flow since the velocity of flow through the basket would be higher than if the water were flowing through the basket by gravity.

Certain other coffee brewers have utilized tapering type infusion chambers in the carafe but this type of infusion chamber becomes a problem when the infusion chamber is to be supported on the heating apparatus.

SUMMARY OF THE INVENTION

In accordance with applicant's invention, the infusion chamber is variable in size to vary the cross-sectional area of the path along which the liquid flows through the infusion basket. In the preferred form, the infusion chamber is variable in size cross-sectionally of the liquid flow from the inlet to the outlet of the chamber. Thus the size of the chamber may be changed to increase the depth of the ground coffee bed to accommodate the brewing of small quantities of coffee of desired strength without using a larger measure of coffee per cup.

In a preferred form of the invention, the coffee infusion chamber is a receptacle in the form of a basket or cup which is provided with internal walls which are movable towards and away from each other to adjust the size of the coffee infusion chamber in accordance with quantity of coffee to be brewed. In the specific form disclosed, the coffee basket has front and back walls joined by the side walls of the basket. Opposed movable wall members are disposed in the basket along respective ones of the basket side walls and extend between the front and back walls of the basket and from opposing walls of the infusion chamber. The coffee infusion chamber is of maximum size when the movable walls are disposed immediately adjacent the side walls of the basket and can be made smaller by moving the walls towards each other. In the specific preferred form disclosed, the movable walls are generally U or C-shaped in configuration so that when moved into engagement with each other, the wall members then define the minimum size infusion chamber for receiving coffee grounds. As walls are moved apart, the size of the infusion chamber for brewing coffee is increased.

In the specific preferred form disclosed, the wall members are moved by operating a rotatable member which moves arms connected to the member and to the movable walls. The rotatable member and the arms function in the manner of a crank to move the walls in opposite directions toward or away from each other, depending upon the direction or rotation of the crank.

The infusion basket is preferably of molded plastic and is provided with an integrally molded shelf at the front of the basket for supporting the operating mechanism for the movable walls and has an integrally molded cover and hinge with the cover being movable to a position for covering the mechanism.

Preferably the basket has clips mounted on its side walls for holding the top portion of a filter when the latter is placed in the basket.

In operation, a cup-type filter is clipped into place, preferably with the walls at their maximum size position, the walls adjusted in accordance with the quantity to be brewed to adjust the cross-sectional area of the infusion chamber and filter, and the ground coffee then place in the filter. The filter itself forms a flexible wall infusion chamber which will confine the coffee if the relatively movable walls do not form a closed chamber.

Accordingly, an object of the invention is to provide a new and improved infusion chamber for use in coffee makers or other infusion apparatus which includes means for varying the size of the infusion chamber for different quantities of beverage, or the like, being made.

A further object is to provide a new and improved infusion chamber, particularly a coffee infusion chamber which is adapted for use in drop coffee makers and to receive a cup-shaped filter for holding ground coffee, in which a wall can be relatively positioned to control the cross-sectional area of the chamber and the thickness of the infusion bed for a given quantity of coffee.

Another object is to provide such an infusion chamber which has a small number of individual parts and which can be readily assembled.

Further advantages and features of the present invention will be apparent from the following description of a preferred form of the present invention made with reference to the accompanying drawings forming a part of this specification for all subject matter shown therein and in which FIG. 1 is a pictorial view of a coffee maker embodying the present invention;

FIG. 4 is a top plan view of the basket with part of the basket shown in phantom and a portion of an operating mechanism associated therewith cut away;

FIG. 5 is a view taken along line 5—5 of FIG. 2;

FIG. 6 is a cross-sectional view taken along line 6—6 of FIG. 2;

FIG. 7 is a fragmentary side elevational view of the bakset with the cover therefore shown in open position of the cover as molded;

FIG. 8 is an exploded view showing the operating mechanism and movable walls of the basket of FIG. 2;

FIG. 10 is a fragmentary cross-sectional view taken along line 10—10 of FIG. 2.

DESCRIPTION OF A PREFERRED EMBODIMENT

While the present invention relates generally to a method and apparatus for infusing substances such as coffee, tea, etc., into a liquid, it is particularly applicable to filter type automatic drip coffee brewers in which the infusion chamber (coffee basket) is supported by the water heating apparatus.

Figure 1:
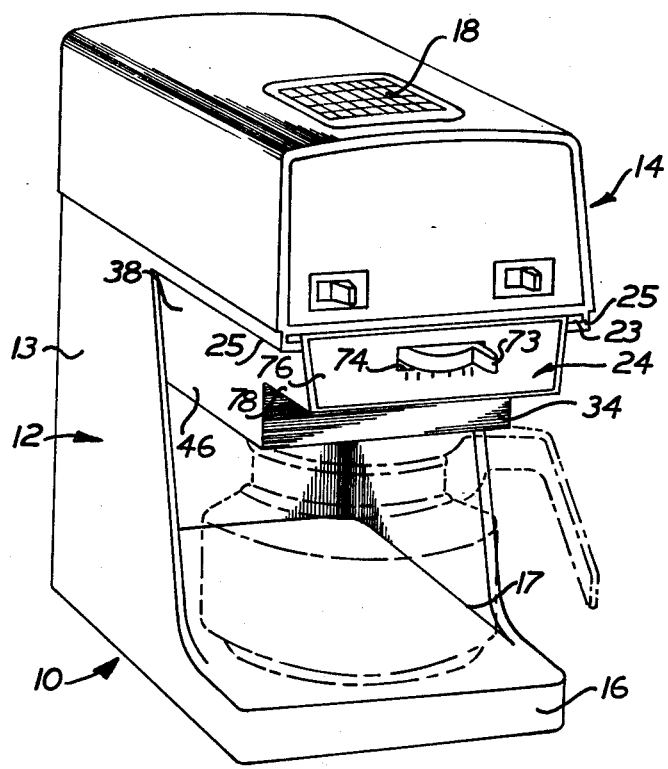
Figure 3:
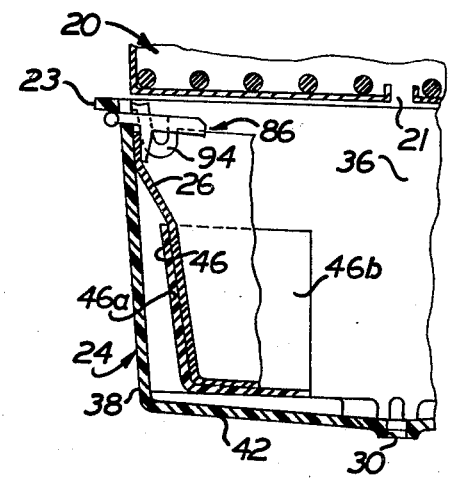
FIG. 3 is a cross-sectional view of the basket taken along lines 3—3 of FIG. 2.

Referring to FIG. 1, a filter type automatic drip coffee maker 10 is shown which comprises a pedestal 12 comprising a column 13 and a hood structure 14 supported at the top of the column. The pedestal also has a base 16 which extends underneath the hood structure and which provides a support for a carafe 17 for receiving the brewed liquid. The hood structure has a fill opening 18 into which cold water is poured. The water is heated by a water heater unit within the coffee maker, a portion of which is shown in FIG. 3 and designated by the reference numeral 20. The water heater unit has a stand pipe which provides an outlet 21 for the heated water to flow downwardly from the underside of the hood. The water flows from the outlet 21 into a coffee infusion receptacle or basket 24 located adjacent the underside of the hood.

The coffee infusion basket 24 is removably supported by a pair of spaced rails 25 adjacent the underside of the hood structure 14 and the basket has a lip 23 on its upper portion which extends outwardly from the basket to engage and slide on the rails.

The infusion basket 24 is provided with a filter 26 (see FIG. 3) and filled with coffee grounds prior to placing it into the position as shown in FIG. 1. During brewing, the water flows from the heating apparatus along a path through the coffee grounds and filter in the infusion basket and out through an opening 30 in the bottom of the basket and into the carafe.

As is conventional, the infusion basket is of a size such that it will hold sufficient ground coffee to brew a relatively large quantity of beverage, e.g. ten or twelve cups. When ready for use, a filter is first placed in the coffee basket followed by the proper amount of ground coffee. Conventionally, a predetermined measure is used for each cup of coffee to be brewed so that if two cups of coffee are to be brewed, two measure of ground coffee are placed in the basket and if ten cups of coffee are to be brewed, ten measures of coffee are used.

The infusion basket shown is generally rectangular in configuration and is of molded plastic. The basket has opposed front and back walls 34, 36 respectively and opposed side walls 38, 40 joining the front and back walls. The top of the basket is open and a bottom wall 42 closes the bottom of the basket but is provided with the outlet opening 30 in a channel 31 in the bottom of the basket for delivering the coffee beverage from the infusion basket to the carafe.

The basket 24 has means for varying the cross-sectional area of the infusion chamber to control the depth or thickness of grounds for a given quantity of coffee comprising in the preferred embodiment, movable walls 46, 47. By moving the walls to decrease the cross-sectional area of the chamber for the filter and ground coffee, water must flow through a greater depth of ground coffee for a given quantity of the latter in the chamber, i.e. the infusion thickness of the coffee bed is increased. Accordingly, when small quantities of coffee are used in the basket the walls are moved to reduce the distance between walls 46, 47 to increase the depth of the coffee bed in the filter.

If the basket is of a fixed size to accommodate both the brewing of large quantities of coffee and small quantities of coffee, the water from the water flowing through the infusion basket will not be in contact with the grounds for the same period of time for small quantities of coffee in the basket as compared to larger quantities of coffee are present when brewing, for example ten or twelve cups. Heretofore, users have compensated for this variation in the thickness of the coffee bed by using larger measures of coffee per cup when brewing small quantities of a coffee beverage.

The movable wall members 46, 47 are generally U-shaped in configuration and have sections 46a, 47a while lie along the adjacent one of the side walls 38, 40 and end sections 46b, 46c, and 47b, 47c which project inwardly from the sections 46a, 47a respectively to lie along the front and back walls 34, 36 respectively of the basket. The movable members taper downwardly and inwardly to an inwardly extending flange 46d, 47d respectively, to each define a partial section of a cup. The flanges 46d, 47d form supporting flanges for the bottom of the filter at the edge of the filter. The opposing end sections 46b, 46c and 47b, 47c of the movable wall members 46, 47 terminate short of each other when the movable wall members are disposed along the outer side walls of the basket and the wall members slidably rest on ribs 49 rising from the bottom 42 of the basket and generally radiating from the outlet 30.

Figure 2:
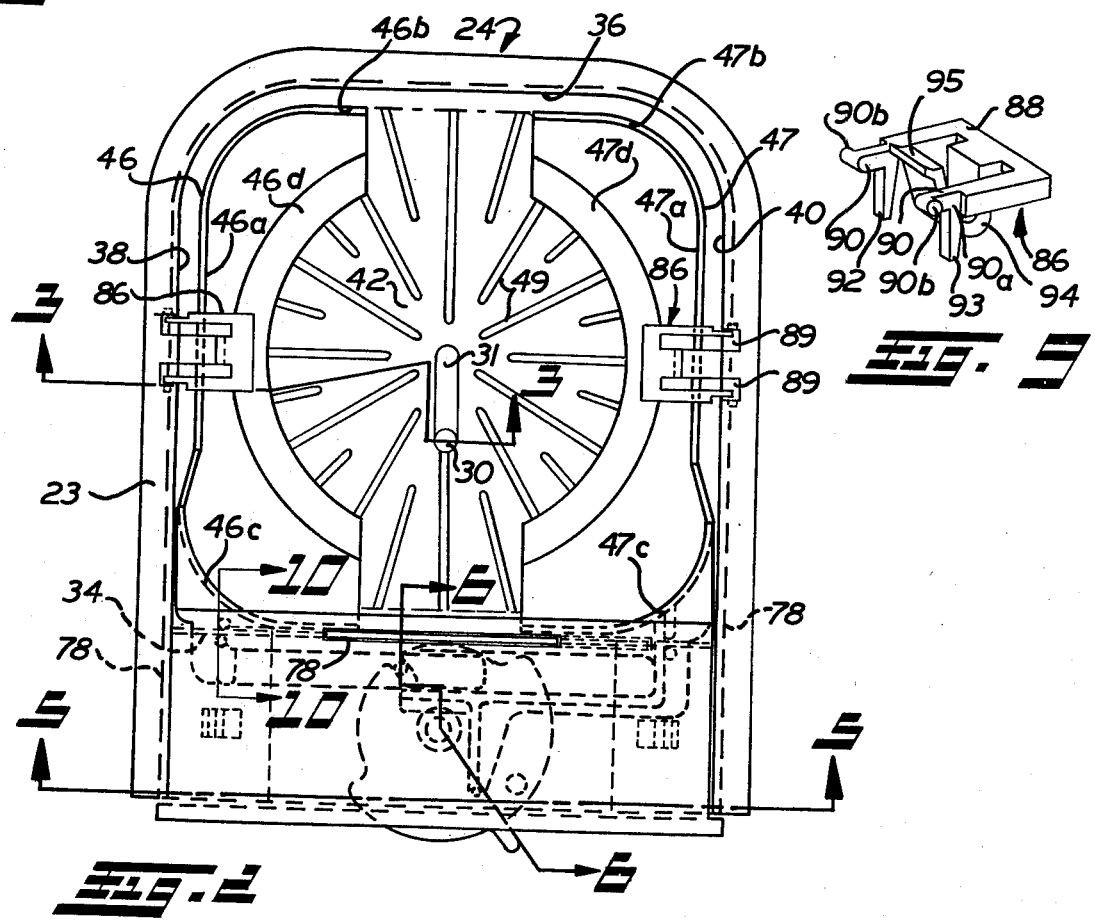
FIG. 2 is a top plan view of the removable coffee infusion basket of the coffee maker of FIG. 1.

The movable walls can be moved toward each other from the position shown in FIG. 2 to a position to that shown in FIG. 4 to decrease the lateral extent of the chamber transversely of liquid flow, that is, the cross-sectional area of the width of the chamber, and can be moved until the end sections in one of the movable wall member engage the corresponding end sections on the other movable wall member. In this position, the movable wall members define a closed wall around the infusion chamber and the chamber is configured to provide the proper depth of coffee in the chamber for the smallest quantity to be brewed when using a normal measure of coffee. As the number of cups to be brewed increases, the walls are moved apart to increase the size of the coffee chamber to accommodate the larger amount of coffee. It will be clear that by moving the walls, the chamber can be sized so that the desired depth of coffee grounds are maintained in the infusion chamber, thus making it possible to brew the same strength coffee for a given measure per cup of coffee regardless of whether the user is brewing two cups of coffee or ten cups of coffee. Accordingly, the user will save coffee when brewing small quantities as well as while obtaining more consistent strength for a given measure of coffee when brewing different quantities of coffee.

Figure 9:
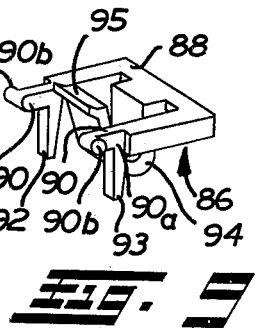
FIG. 9 is a detached view of a clamp shown in FIG. 3.

The movable wall members 46, 47 have portions 51a, 52 respectively at the end sections 46c, 47c which extend upwardly to about the height of the basket 24. The sections 46c, 47c have L-shaped arms 50, 51, respectively, integrally molded therewith. The arms 50, 51 extend from the top of the wall members through respective openings 53, 54 in the top of the front wall 34 with the longer portion of the "L" then extending along the outer side of the front wall above a shelf 56. The shelf projects horizontally outwardly from the front wall of the basket. The arm 51 overlies the arm 50 and has a downwardly opening channel 57 which slidably receives the arm 50 to guide the movement of the movable wall members 46, 47 toward and away from each other. The arm 50 also has integrally molded depending guide pins 58 which are disposed on opposite sides of the front wall 34 which cooperate with the latter to position and guide the movable member. (See FIGS. 8 and 9). The arm 51 has corresponding guide pins not shown as well as a guide pin 58a at its outer end.

The arms 50, 51 are part of an actuating mechanism 60 for positioning the movable wall members 46, 47. This actuating mechanism comprises a rotatable plate 62 rotatably supported on a boss 64 which is molded as an integral part of a raised central portion 66 of the shelf 56. The arms 50, 51 are connected to the rotatable plate by respective pins 68, 69 depending from the underside of the molded integrally with the arms 50, 51. The pins are received in respective elongated openings 70, 71 in the rotatable plate with the openings being off-cener and located so that when the plate is rotated in one direction, the wall members will move in opposite directions to move the wall members 46, 47 away from or toward each other. Rotation of the plate in one direction will move the members toward each other and rotation of the plate in the opposite direction will move the members away from each other. In the preferred embodiment the elongated openings 70, 71 in the plate 62 lie along a line through the axis of rotation of the plate 62 and are on opposite sides of the axis. The rotatable plate is provided with an actuating handle 73 which projects through an opening 74 in a cover 76 for the support shelf and actuating mechanism. The cover is molded integrally with the shelf 56 by a section 76c of reduced thickness (see FIGS. 6 and 7) which reduced section functions as a plastic hinge to enable the cover to move to a position overlying the shelf 56 and actuating mechanism associated therewith. The cover has a front portion 76a through which the rotatable member 62 and operating handle project and a top portion 76b which has a slot 78 for receiving the top portion of the front wall 34 located between the openings 54. The cover 76 together with the basket front wall 34 shelf 58 and extensions 78 of the side walls of the basket form a compartment for the operating mechanism.

As shown in FIG. 1, the cover has indicia adjacent the handle of the actuating mechanism to indicate the setting of the movable members. The rotatable plate 62 of the actuating mechanism preferably has depending flange 80 about its periphery with a portion 80a of the flange cooperating with a boss 82 on the shelf 56 to provide a detent mechanism for the different settings of the handle 73. The boss 82 rides against the internal periphery of the flange portion 80a which has recesses therein which are correlated with settings of the movable wall members for brewing the quantities indicated by the indicia on the front cover. It will be noted that the flange 80 has a portion which outlines the opening 71 therein and which function as a stop (10 cup stop) for the rotatable plate and a shoulder 80b formed by the reduction in width of the rotatable plate which functions as a stop against the boss 82 which is when the rotatable plate is set in the minimum position (2 cup).

The cover is latched into position by a pair of spaced latch members 79 extending inwardly from the front of the cover when in covering position to latch under corresponding fingers 79a extending from the top of yieldable latching posts 79b to form a snap type latch which can be released by pulling the cover upwardly. The posts are located on opposite sides of the rotatable plate 62 and are integrally molded with the shelf 56.

Preferably the side walls of the basket are each provided with a respective clamp mechanism 86 for gripping the filter when the latter is put into the infusion basket. The clamps (see FIGS. 2 and 9) each comprise a plastic frame portion 88 which has yieldable leg portions 90 that snap into respective spaced openings 89 in the top portion of the corresponding side wall. Each opening 89 extends downwardly from the top of the side wall inside of the basket flange to a point underneath the flange so that the legs when extending through the opening are positioned immediately underneath the flange. The legs have notches 90a which receive the wall portions of the side wall adjacent the legs and pins 90b extending laterally of each leg portion which lie along the outer side wall of the basket underneath the flange. This construction allows the rotation of the clamp from an open position where the frame extends generally upwardly from the basket to a closed position with the frame extending generally horizontally. The frame also has depending legs 92, 93 which move to engage and clamp the filter against the side wall when the clamp is closed. A U-shaped 94 dog integrally molded with the frame member is positioned between the legs 92, 93. This dog terminates in an end portion 95 which when the clamp is open is positioned above the top of the side wall but which moves downwardly against the side wall when the clamp is closed. The U-shaped dog must yield resiliently to allow the end portion to move downwardly into engagement with the side wall. In closing, the clamp in effect moves over center and the bias in the U-shaped dog holds the clamp closed with the legs 92, 93 bearing against the filter and the side wall of the coffee basket. As the movable wall members are moved to various sides of the chamber, the clamps will hold the top of the filter in an open position adjacent the side walls.

From the foregoing it can be seen that in the present invention, an infusion chamber with relatively movable walls makes it possible to accommodate the cross-sectional area of the infusion chamber, that is the area transverse to the direction of liquid flow, to be varied which in turn varies the depth of the infusion basket for a given quantity of coffee. As noted this results in a saving of coffee as compared to a chamber which has a relatively fixed cross-sectional area when smaller quantities of coffee or the like is being brewed. Also it enables the infusion chamber, in this case the coffee basket, to be mounted on the water heating apparatus and the carafe to be moved into and out of position since the disclosed structure enables the height of the coffee basket to be shorter than would be the case if the configuration of the coffee basket were such that as to provide a similar effect by making the coffee basket progressively smaller.

What is claimed is:

1. An infusion apparatus for brewing coffee or the like comprising a receptacle comprising an infusion chamber for receiving infusion material to be infused into a liquid as the latter flows through the chamber from an inlet zone to an outlet zone, and means for changing the size of said chamber laterally of the path from said inlet zone to said outlet zone to change for a given quantity of infusion material in said chamber the thickness of infusion material along the path through which the liquid must flow, said receptacle having an outer side wall, a support portion extending outwardly from said side wall, said means for changing the size of said chamber comprising an actuating mechanism on said support portion, and a cover member on said support portion movable from a position covering said actuating mechanism on said support portion to a position exposing said actuating mechanism, and means for latching said cover in a closed position.

2. An infusion apparatus as defined in claim 1 wherein said receptacle including said support portion are integrally molded and said cover is integrally molded with said support portion and said means for latching said cover comprises latching parts integrally molded with said cover and said receptacle including said support portion and said means supporting said plate for rotation is integrally molded with said support portion.

3. An infusion apparatus as defined in claim 1 wherein said actuating mechanism comprises a rotatable member mounted for rotation on said support portion and freely separatable from said support portion and at least one actuating arm extending from said rotatable member into said receptacle and freely separatable from said receptacle including said support portion, said arm and said rotatable member being held in assembled position on said support portion by said cover when in its closed position.

4. An infusion apparatus as defined in claim 3 wherein said receptacle includes an internal movable wall member and said arm is connected to said movable wall member to operate the latter with the movable member being held in the receptacle by said cover holding said arm its assembled position, said movable wall member being freely separated from the receptacle when said cover is open to render said arm freely separable from said support portion.

5. An infusion apparatus as defined in claim 4 wherein said receptacle including said support portion are integrally molded and said cover is integrally molded with said support portion and said means for latching said cover comprises latching parts integrally molded with said cover and said receptacle including said support portion and said means supporting said rotatable member for rotation is integrally molded with said support portion and said arm is integrally molded with said movable wall member.

6. An infusion apparatus as defined in claim 4 wherein said arm extends along side the outer side of said outer side wall and has a portion engaging said outer side wall to guide said arm and said movable wall member.

7. An infusion apparatus as defined in claim 6 wherein said receptacle including said support portion are integrally molded and said cover is integrally molded with said support portion and said means for latching said cover comprises latching parts integrally molded with said cover and said receptacle including said support portion and said means supporting said rotatable member for rotation is integrally molded with said support portion and said arm is integrally molded with said movable wall member.

8. An infusion apparatus as defined in claim 4 wherein said receptacle has a second movable wall forming said infusion chamber and a second arm connected to said rotatable member and held in assembled relationship by said cover, said arms lying along said outer wall in telescoped relationship and guiding the movement of said movable wall members.

9. An infusion apparatus as defined in claim 8 wherein said receptacle including said support portion are integrally molded and said cover is integrally molded with said support portion and said means for latching said cover comprises latching parts integrally molded with said cover and said receptacle including said support portion and said means supporting said plate for rotation is integrally molded with said support portion and said arms are integrally molded with their respective movable wall member.

10. An infusion apparatus having infusion means for infusing a substance into a liquid received from a heating means for heating the liquid and having an imperforate bottom for the infusion means with a small outlet area for delivering infused liquid to a container for infused liquid with the liquid flowing from the heating means and making a single pass through said infusion means to the container, said infusion means comprising external wall means defining with the imperforate bottom an open top receptacle for receiving a filter, opposed relatively movable wall means disposed internally of the receptacle and extending along opposed wall sections of said external wall means and having facing sides with the facing sides defining a variable filter chamber adapted to receive a flexible bowl-shaped filter having a flat continuous bottom surface, said relatively movable walls being supported in said receptacle for relative lateral movement along a line which extends normal to a plane perpendicular to the botom of the receptacle to vary the distance therebetween and to change the size of said variable filter chamber laterally of the direction of liquid flow from the top of said receptacle to its outlet area and thereby expanding and contracting the cross sectional area of the variable filter chamber in a plane perpendicular to the first mentioned plane to change for a given quantity of infusion material in said chamber the thickness of the infusion material along the path through which the liquid must flow to provide a desired thickness of infusion material between the top and the bottom of the receptacle.

11. An infusion apparatus as defined in claim 10 wherein said opposed relatively movable walls have projecting end portions disposed adjacent and extending along opposed wall sections of said external wall means of said receptacle.

12. An infusion apparatus as defined in claim 11 comprising a rotatable member and an arm connected to said rotatable member and to one of said opposed relatively movable walls to move said walls linearly with respect to one another upon rotation of said rotatable member.

13. An infusion apparatus as defined in claim 12 comprising a respective arm on each of said opposed relatively movable walls and means connecting each of said arms to said rotatable member to move said opposed relatively movable walls upon rotational movement of said rotatable member, said rotatable member being disposed exteriorly of said variable filter means.

14. An infusion apparatus as defined in claim 13 wherein said rotatable member is rotatable about its axis and said arms are connected to said rotatable member outwardly of the axis of said rotatable member to move said arms in different directions upon rotation of said rotatable member in one direction.

15. An infusion apparatus as defined in claim 10 wherein said opposed relatively movable walls are each movable toward and away from the center of the variable filter chamber and have projecting end portions disposed adjacent and extending along opposed wall sections of said external wall means of said receptacle, a rotatable member disposed exteriorly of said variable filter chamber and rotatable about its axis, a respective arm connected to said rotatable member and to each of said movable walls to move said walls linearly with respect to one another upon rotation of said rotatable member to vary the distance therebetween to change the size of said variable filter chamber upon rotation of said rotatable member, and means connecting each of said arms to said rotatable member outwardly of the axis of said rotatable member to move said arms and movable walls in different directions upon rotation of said rotatable member in one direction.

* * * * *